United States Patent [19]

Matsuyama

[11] 4,367,535
[45] Jan. 4, 1983

[54] CALCULATOR FOR CROSS SUMMING A PLURALITY OF OPERANDS

[75] Inventor: Shigeru Matsuyama, Tokyo, Japan

[73] Assignee: Canon Kabushiki Kaisha, Tokyo, Japan

[21] Appl. No.: 154,867

[22] Filed: May 30, 1980

[30] Foreign Application Priority Data

Jun. 11, 1979 [JP] Japan .................................. 54-73642

[51] Int. Cl.³ .......................... G06F 7/50; G06F 15/20
[52] U.S. Cl. ..................................... 364/736; 364/768
[58] Field of Search ................ 364/736, 768, 715, 200

[56] References Cited

U.S. PATENT DOCUMENTS

| | | | |
|---|---|---|---|
| 3,564,226 | 2/1971 | Seligman | 364/736 |
| 3,593,313 | 7/1971 | Tomaszewski et al. | 364/715 X |
| 3,812,470 | 5/1974 | Murtha et al. | 364/736 X |
| 3,973,113 | 8/1976 | Goldsamt | 364/709 |
| 4,128,880 | 12/1978 | Cray, Jr. | 364/200 |

Primary Examiner—David H. Malzahn
Attorney, Agent, or Firm—Fitzpatrick, Cella, Harper & Scinto

[57] ABSTRACT

A calculator which adds or subtracts input numerical data to or from the content of a first register in response to an actuation of an addition or subtraction key, stores the result of the addition or subtraction in the first register, further adds or subtracts the above-mentioned input numerical data to or from the content of a second register determined by the number of actuations of the addition or subtraction key, and stores the result of the latter addition or subtraction into the second register.

6 Claims, 2 Drawing Figures

CALCULATOR FOR CROSS SUMMING A PLURALITY OF OPERANDS

BACKGROUND OF THE INVENTION

1. Field of the Invention

The present invention relates to a calculator capable, in response to an actuation of the addition or subtraction key, of executing addition or subtraction of the input numerical data with the contents of registers and storing the results of such addition or subtraction in the respective registers.

2. Description of the Prior Art

Consider the mathematical problem presented by the following: a wholesaler delivers merchandise x to the retailers A, B and C in the respective monetary amounts of xA, xB and xC, another merchandise y in the amounts of yA, yB and yC, and still another merchandise z in the amounts of zA, zB and zC. Prior art having required calculation of electronic devices the total sales amounts Sx, Sy and Sz of merchandises x, y and z and the total sales amounts $T_A$, $T_B$ and $T_C$ of retailers A, B and C, separately according to the following equations:

$$Sx = xA + xB + xC, \quad Sy = yA + yB + yC,$$
$$Sz = zA + zB + zC,$$

$$T_A = xA + yA + zA, \quad T_B = xB + yB + zB,$$
$$T_C = xC + yC + zC.$$

Moreover the grand total of the sales has had to be further calculated according to the equation $S_T = Sx + Sy + Sz$ or $S_T = T_A + T_B + T_C$, and these calculations require quite cumbersome operations.

SUMMARY OF THE INVENTION

Therefore, an object of the present invention is to provide a calculator avoiding the necessity of the calculations being repeated with the same data in the case of making summations in different ways from the same group of data.

Another object of the present invention is to provide a calculator capable, in calculating summations according to equations such as $Sx = xA + xB + xC$, $Sy = yA + yB + yC$ and $Sz = zA + zB + zC$, of providing other sums $T_A$, $T_B$, $T_C$ and $S_T$ at the same time.

BRIEF DESCRIPTION OF THE DRAWINGS

These and other objects of the present invention will be made more apparent from the following description of the preferred embodiment to be taken in conjunction with the attached drawings, in which.

DESCRIPTION OF THE PREFERRED EMBODIMENTS

Now the present invention will be explained in detail by means of an embodiment in which the present invention is applied to an electronic calculator.

Figure 1:
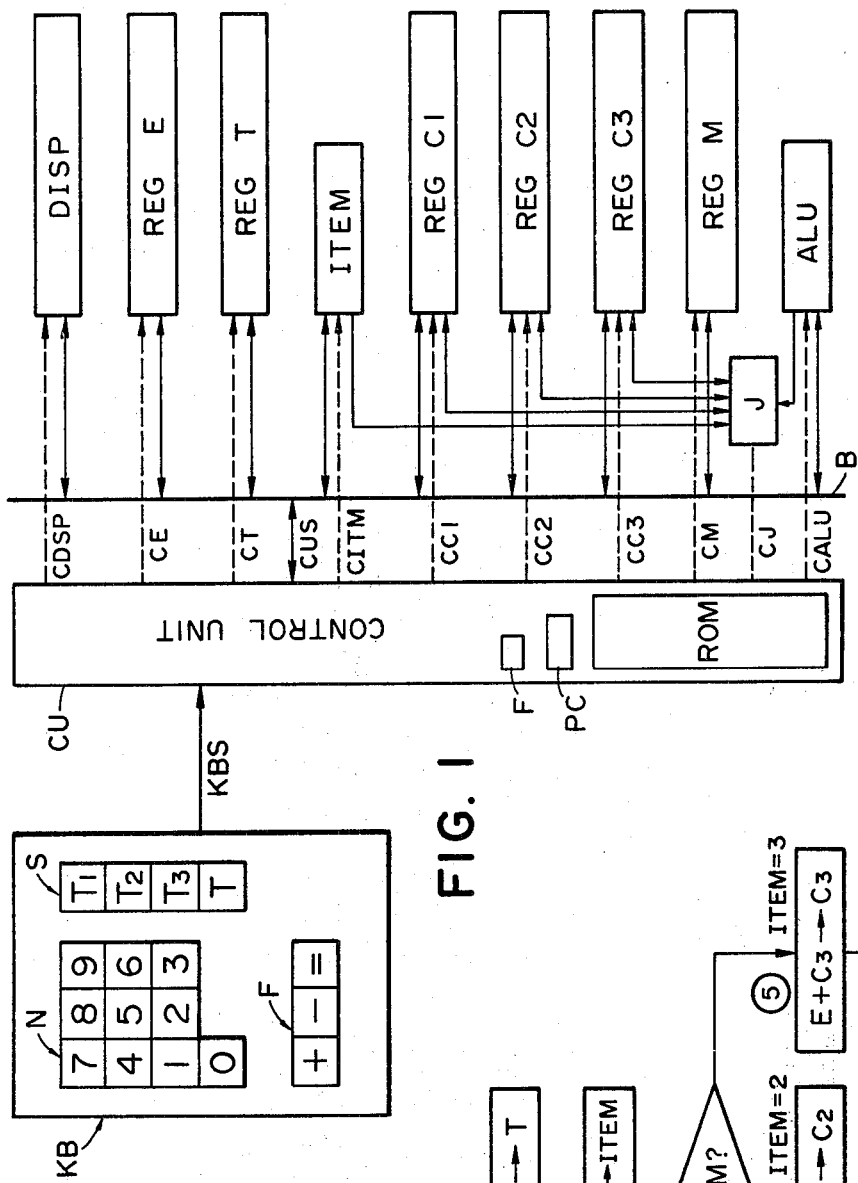
FIG. 1 is a schematic block diagram showing an embodiment of a calculation in accordance with the present invention.

FIG. 1 shows an electronic calculator embodying the present invention in a block diagram.

A keyboard KB comprises numeral keys N of the numerals of 0 to 9, function keys F such as "+", "−", "=", etc., and display keys S in which the keys T1, T2, T3 and T give a visual display of the content respectively of registers C1, C2, C3 and M to be explained later.

A control unit CU supplies various control signals (CDSP, CE, CT, CITM, CC1, CC2, CC3, CM, Cj and CALU) and data signals CUS to the circuits to be explained later in response to the keyboard signal KBS from the keyboard KB or signals from other portions of the system. There are shown 4-bit parallel registers E, T, ITEM, C1, C2, C3 and M. The register E stores input numerical data, ITEM is an item count register for counting the number of actuations of the key "+" or "−", and registers T, C1, C2, C3 and M are used for storing the results of addition or subtraction.

A display device DISP provides a visual display of the data in the registers.

An arithmetic logic unit ALU conducts processings such as addition or subtraction on the data supplied on a bus line B in response to the control signal CALU supplied from control unit CU.

A transfer judgement unit J senses the data in the register C1, C2 or C3 to or from which the data in the register E is added or subtracted according to the content of the item count register ITEM, transfers thus sensed data to arithmetic logic unit ALU and also transfers the result of such addition or subtraction with those data in the register E to its original register. The above-mentioned control unit CU is composed of a sequence control comprising a clock generator, gates and other logic network, a read-only memory ROM storing the microinstructions for controlling various circuits in the form of a program sequence, and a flag circuit F.

Now the operations of the above-mentioned embodiment will be discussed with reference to the block diagram shown in FIG. 1 and the control flow chart shown in FIG. 2.

The control unit CU generates following signals in response to the signals from the keyboard KB under the conditions of the remaining portions of the system:

CDSP: a signal for controlling the display unit DISP;

CE: a signal for transferring data from the register E to the busline B or from the busline B to the register E;

CT: a signal for transferring data from the register T to the busline B or from the busline B to the register T;

CITM: a signal for transferring data from the register ITEM to the busline B, or from the busline B to the register ITEM, or from the register ITEM to the transfer judgement unit J;

CC1: a signal for transferring data from the register C1 to the busline B, or from the busline B to the register C1, or from the register C1 to the transfer judgement unit J;

CC2: a signal for transferring data from the register C2 to the busline B, or from the busline B to the register C2, or from the register C2 to the transfer judgement unit J;

CC3: a signal for transferring data from the register C3 to the busline B, or from the busline B to the register C3, or from the register C3 to the transfer judgement unit J;

CM: a signal for transferring data from the register M to the busline B, or from the busline B to the register M;

CALU: a signal for transferring data from the arithmetic logic unit ALU to the busline B, or from the busline B to said unit ALU, or from unit ALU to the transfer judgement unit J; and CJ: a signal for controlling the transfer judgement unit J.

Figure 2:
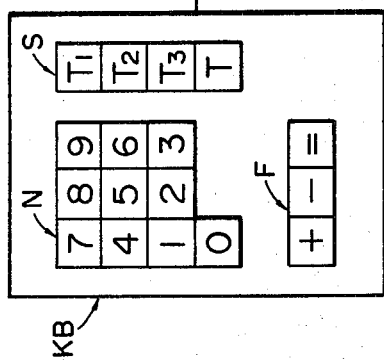
FIG. 2 is a chart showing the control sequence for the circuit shown in FIG. 1.
Figure 2:
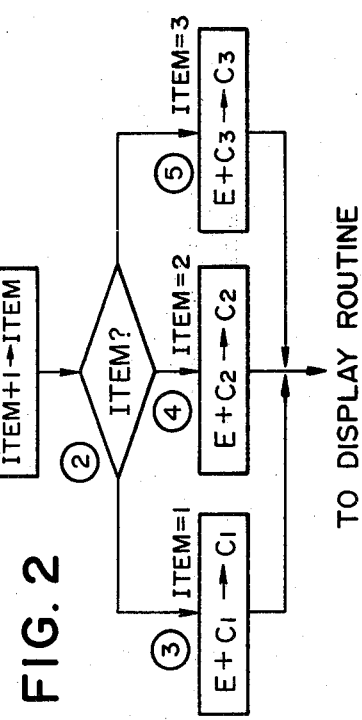

For example, upon actuation of the addition "+" key after the entry of numerical data from the keyboard KB to the register E, the program counter in the above-mentioned read-only memory ROM is set at the step (1) in FIG. 2, and the control signals composed of the aforementioned microinstructions are supplied in sequence from the memories addressed by the program counter to various circuits for executing the required process. At first the control signals CE, CT and CALU are produced to transfer the data from the registers E and T to the arithmetic logic unit ALU, to execute the required addition operation therein and to transfer the result thereof to the register T. Then in response to the control signals CITM and CALU the data in the item count register ITEM is transferred to the arithmetic logic unit ALU, increased by one therein, and the result is again stored in the item count register ITEM. Then the content of the item count register ITEM is determined in the step (2), and the program counter PC is set at the step (3), (4) or (5) respectively when the count is "1", "2" or "3". For example in case the count is "2", the program counter PC is set at the step (4), at which, control signals CE, CC2 and ALU are developed to transfer the data from the register E and the register C2 to the arithmetic logic unit ALU, to execute the addition operation therein and to store the result of the addition in the register C2, whereby the sequence is transferred to the display routine.

Upon subsequent actuation of the equal "=" key, the control signals CT, CM and CALU are generated to transfer the data from the registers T and M to the arithmetic logic unit ALU, to execute the addition operation therein and to store the result of the addition in the register M. Also the flag F is set in the control unit CU. Upon subsequent actuation of a numeral key, etc., for starting a new calculation, the register T and the item count register ITEM are reset to "0" by sensing the state of flag F.

Because of the above-explained functions of the addition "+" key and the equal "=" key, the key operations in the sequence of xA[+]xB[+]xC[+][=], yA[+-]yB[+]yC[+][=], zA[+]zB[+]zC[+][=] in the foregoing example would provide the aforementioned sums $S_x$, $S_y$ and $S_z$ on the register T in response to the respective actuations of the "=" key. After the above-mentioned key sequence, the contents of the registers C1, C2, C3 and M respectively corresponding to the aforementioned sums $T_A$, $T_B$, $T_C$ and $S_T$ would be obtained by actuating the keys T1, T2, T3 and T.

In this manner it is rendered possible to obtain the sums $T_A$, $T_B$, $T_C$ and $S_T$ simultaneously with the key operations for calculating the sums $S_x$, $S_y$, and $S_z$, without requiring separate key operations for calculating the sums $S_x$, $S_y$, $S_z$; $T_A$, $T_B$, $T_C$; and $S_T$.

What I claim is:

1. A calculator comprising:
   input means for entering expressions and operands of said expressions, the results of which are to be calculated;
   counter means connected to said input means for counting and storing the number of entries, in each said expression, of operands from said input means;
   address means connected to said counter means for generating a memory address signal in response to each count of said counter means;
   a plurality of first memories connected to said address means, one of said plurality of first memories being selected by each memory address signal;
   a second memory for storing the results calculated from said operands by said expressions entered by said input means; and
   processing means connected to said input means, to said plurality of first memories, and to said second memory, for adding each one of said operands, entered by said input means, to the content of said one of said plurality of first memories then selected by the memory address signal generated by said address means in accordance with the count by said counter means and storing the added result in said one of said plurality of first memories; and for executing each said expression on said operands and storing the result of said execution in said second memory.

2. A calculator according to claim 1 further comprising means connected to said plurality of first memories for displaying the contents of said plurality of first memories according to manual selection.

3. A calculator according to claim 2, wherein said displaying means comprises keys corresponding respectively to said plurality of first memories for displaying the content of one of said plurality of first memories in response to an actuation of a corresponding one of the keys.

4. A calculator according to claim 1, wherein said counter means comprises means for returning a count thereof to its initial state in response to the execution of a calculating expression.

5. A calculator according to claim 4 further comprising a completion input key for entering the identification of the completion of a calculating expression, said returning means being operative in response to the actuation of said completion input key.

6. A calculator according to claim 1 further comprising operational instruction input means for entering an operational instruction, said operational instruction input means being actuated for entering the operational instruction subsequent to the entry of the operands from said input means, said counter means initiating counting of the number of entries of the operands in response to an actuation of said operational instruction input means.

* * * * *